(No Model.)
J. D. COX, Jr.
GUIDE FOR DRILL BLANKS.
No. 367,894. Patented Aug. 9, 1887.
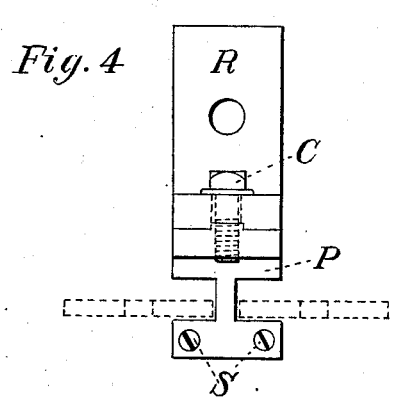
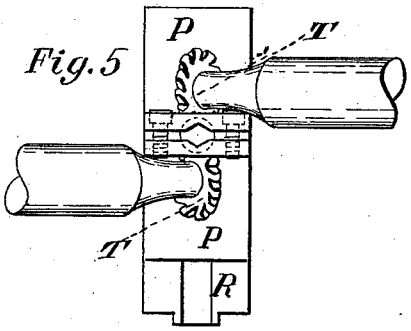
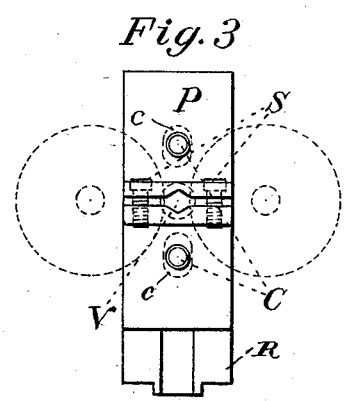
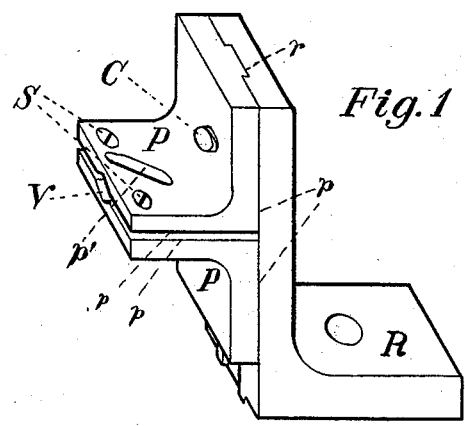
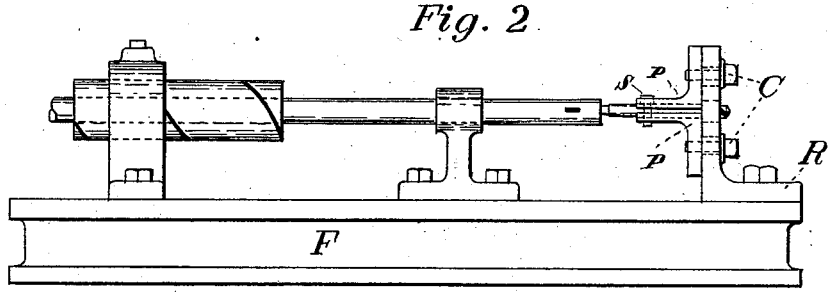
Witnesses;
C. O. Palmer.
Jennie Byrne
Inventor
Jacob D. Cox Jr.
by
H. J. Fisher,
Attorney.

UNITED STATES PATENT OFFICE.

JACOB D. COX, JR., OF CLEVELAND, OHIO, ASSIGNOR TO COX & PRENTISS, OF SAME PLACE.

GUIDE FOR DRILL-BLANKS.

SPECIFICATION forming part of Letters Patent No. 367,894, dated August 9, 1887.

Application filed January 24, 1887. Serial No. 225,253. (No model.)

*To all whom it may concern:*

Be it known that I, JACOB D. COX, Jr., a citizen of the United States, residing at Cleveland, in the county of Cuyahoga and State of Ohio, have invented certain new and useful Improvements in Guides for Drill-Blanks; and I do hereby declare that the following is a full, clear, and exact description of the invention, which will enable others skilled in the art to which it appertains to make and use the same.

My invention relates to that part of a twist-drill milling-machine or twist-drill clearing-machine that guides the drill-blank to its place between the cutters or metal-removing devices and holds it there securely while it is being operated upon. The usual form of such device is an elongated cylinder with a central annular hole of approximately the same diameter as that of the drill to be operated upon, with openings through the shell for admitting the milling-cutters or grinding-wheels. This form of guide or bushing can be used for but one size of drill, and consequently a large number of bushings or guides with different-sized holes in them to accommodate the different-sized drills to be operated upon must be kept constantly on hand. The expense of keeping them up is very great also, as they rapidly wear out, the holes being constantly worn larger by the action of the drill passing through them. In the process of milling the grooves in a twist-drill the cutters throw up a burr or fin that rapidly wears away the portion of the guide that touches the drill-blank. This worn surface will be in the form of a spiral indentation. This wearing away soon makes the ordinary cylindrical guide or bushing too loose, and the drill-blank will have play enough to allow it to vibrate under the action of the cutter, causing the surface of the grooves that are milled out to be rough. Only a limited number of drills can be milled before the guide is worn out, and a new one must be substituted. By the use of my invention an unlimited number of drills of the same size can be milled, for when the sides of the guides become worn they can be pressed closer together and firmly held in the new position by suitable screws provided for that purpose, substantially as shown. This closing of the guide can be repeated as often as is necessary. When all of the drills of a given size are milled, the only change necessary in the guides before beginning another size is to open or close them more or less to fit the new-sized drill, and this process can be continued through a large range of sizes. In practice I make the guides as thick as the diameter of the cutters will allow, and make the grooves small enough to hold the smallest-sized drill usually milled on a machine of a given size. As the grooves in the guides wear larger, they are used for larger drills, and eventually either transferred to a machine where still larger drills are milled, or the grooves are made smaller by planing off the faces of the guides. By the use of this form of guide a great saving in cost of repairs is effected. The machine on which they are used can be more quickly changed or adjusted from one size to another and better and smoother work can be done.

The object of my invention is to lessen the number of pieces which it is necessary to keep on hand, to provide a form of guide or bushing that can be adjusted to accommodate drills of different diameters, and to take up the lost motion caused by the wearing away of those portions of the guide that come in contact with the surface of the drill-blank while it is in motion or undergoing the operation.

Figure 1 is a perspective view of my invention. Fig. 2 is a side elevation of the guides mounted in position on the bed of a machine. Fig. 3 is a front elevation of the guides, looking toward the left hand of Fig. 1. Fig. 4 is a top view. Fig. 5 is an end view of part of a machine such as is described in Patent No. 286,150, on which my invention is attached. Figs. 1 and 5 show the form of guide used for milling the blanks. Figs. 3 and 4 show the form used on back clearing machines, where emery-wheels are used instead of cutters.

In the drawings, F is the frame or bed-plate of a drill-making machine.

R is an angle-block constructed so as to be bolted down to the frame F, with its center in a line with the center of the drill-holding spindle of said machine.

P P are two pieces of metal, preferably steel, having faces p p at right angles to each other, the faces which lie against the rest R being planed up accurately and fitted into a groove, r, in the rest R, so that they can be adjusted toward or from each other, but cannot be moved in any other direction. On the face of each plate that lies nearest the other plate is cut a V-shaped groove in such a manner that when the two are placed in position on the rest R the sides of the grooves shall be tangent to the drill-blank which is to be operated upon when it is placed in position between the plates. In each of the pieces P P is cut an opening, p', of the shape and size and in the proper place to admit the milling-cutters T T. Emery-wheels or other devices of stone or metal may be used for this purpose. A screw, C, is provided for each piece P P, which, working or riding up and down in an elongated slot or opening, c, in the rest R, serves to securely fasten the piece P in any desired place on the side rest. There are also provided two screws, S S, placed as near the extreme outer end of the pieces P P as possible, which serve to clamp the guides together and prevent any tendency in the guides to spring and chatter while the drill is being operated upon. These guides might be used to hold the drill-blank where the metal-removing devices were entirely outside of the guides and acted on the drill after it had passed through them. In that case the guides would be made very short.

In practice I prefer to have the cutters or metal-removing devices enter openings or slots in the guides, as thus the drill is supported both before and after it comes in contact with the metal-removing devices, and cannot be bent by the action of said metal-removing devices or other cause.

In practice I prefer to use a V-shaped groove in the pieces P P, whose sides are straight lines and which lie at about an angle of one hundred and twenty degrees with each other; but obviously any other angle would accomplish the same purpose. Likewise a groove whose sides are curved would accomplish the same object and embody my idea.

Having thus described my invention, what I claim as new, and desire to secure by Letters Patent, is—

1. In a twist-drill-making machine, a sectional guide constructed to receive and hold the drill between the sections, substantially as set forth.

2. In a twist-drill-making machine, a drill-guide formed in sections, having a portion of the guiding-surface formed in each section, substantially as set forth.

3. In a twist-drill-making machine, a guide constructed in sections adjustable toward and from each other and having a groove for holding the drill, substantially as set forth.

4. In a twist-drill-making machine, a guide consisting of two sections having angular grooves on their meeting faces, in which the drill is held, screws at the sides of the grooves for connecting the sections, and a standard or rest upon which the sections are separately or jointly adjustable, substantially as set forth.

5. In a twist-drill-making machine, a sectional guide having a groove for receiving and holding the drill and an opening entering the groove from the side to admit the metal-removing device, substantially as set forth.

6. In a twist-drill-making machine, a sectional grooved guide for the drill having openings at the sides entering the groove in the guide, in combination with metal-removing devices working through the openings, substantially as set forth.

7. In a twist-drill-making machine, a sectional guide having a groove between the sections, in combination with a standard upon which the guide-sections are adjustable, and having an opening registering with the groove in said sections, substantially as set forth.

8. In a machine for making twist-drills, a guide having a groove for receiving and holding the drill, in combination with a standard upon which the guide is adjustably supported, and having an opening corresponding to the groove in the guide, so that the drill may pass through the same, substantially as set forth.

JACOB D. COX, JR.

Witnesses:
H. T. FISHER,
WM. M. MONROE.